US008346093B2

(12) United States Patent
Kang et al.

(10) Patent No.: US 8,346,093 B2
(45) Date of Patent: Jan. 1, 2013

(54) RECEIVER OF MULTIMEDIA DATA

(75) Inventors: In Won Kang, Seoul (KR); Ho Joon Park, Seongnam-si (KR)

(73) Assignee: Won Yoon-Kyung, Seoul (KR)

( * ) Notice: Subject to any disclaimer, the term of this patent is extended or adjusted under 35 U.S.C. 154(b) by 432 days.

(21) Appl. No.: 12/740,576

(22) PCT Filed: Oct. 30, 2008

(86) PCT No.: PCT/KR2008/006405
§ 371 (c)(1),
(2), (4) Date: Apr. 29, 2010

(87) PCT Pub. No.: WO2009/057958
PCT Pub. Date: May 7, 2009

(65) Prior Publication Data

US 2010/0303475 A1 Dec. 2, 2010

(30) Foreign Application Priority Data

Oct. 30, 2007 (KR) ........................ 10-2007-0109633

(51) Int. Cl.
*H04B 10/00* (2006.01)

(52) U.S. Cl. ......................... 398/128; 398/127; 398/130

(58) Field of Classification Search .................. 398/127, 398/128, 130
See application file for complete search history.

(56) References Cited

U.S. PATENT DOCUMENTS 4,837,556 A * 6/1989 Matsushita et al. .......... 369/47.1
5,075,792 A * 12/1991 Brown et al. ................. 398/115
5,818,618 A * 10/1998 Eastmond ..................... 398/164
7,689,128 B2 * 3/2010 Williams ...................... 398/164
2006/0001902 A1 1/2006 Platteter et al.

FOREIGN PATENT DOCUMENTS

KR 20000065961 A 11/2000
KR 20040007858 A 1/2004

OTHER PUBLICATIONS

International search report dated Aug. 27, 2009 for PCT/KR2008/006405.

* cited by examiner

*Primary Examiner* — Danny Leung
(74) *Attorney, Agent, or Firm* — Fleit Gibbons Gutman Bongini & Bianco PL; Jose Gutman

(57) ABSTRACT

Disclosed is a multimedia data receiver using an optical cable that can receive multimedia data such as an image, voice and control signal whose media are different from each other through an optical transmission medium such as plastic or glass optical cables in a short or long distance area. The multimedia data receiver includes: an optical driver, amplifying a received signal of a single transmission format that is optical-to-electrical converted by an optical module connected to an optical cable, converting a serial data for transmission into an analog signal, performing optical transmission through the optical module; an interface control logic, extracting a control signal from the signal received through the optical driver, interfacing control data; and a digital signal processing logic, converting the signal received through the optical driver into data of the original transmission format through converting the signal into a digital signal and decoding the digital signal, deserializing a serial image data, transmitting the data to a display device connected thereto.

8 Claims, 2 Drawing Sheets

(a)

(b)

(a)

(b)

RECEIVER OF MULTIMEDIA DATA

TECHNICAL FIELD

The present invention relates to a multimedia data receiver that can receive and process multimedia data such as image, voice and control signal whose media are different from each other, where the multimedia data are transmitted through an optical transmission medium such as a plastic or glass optical cable from a short or long distance area.

BACKGROUND ART

In a conventional chip (IC) for communication, a S-ATA method is used in a case of near distance, and an LVDS (Low Voltage Differential Signaling) method is used in a case of short distance, and a TMDS (Transition Minimized Differential Signaling) method is used in a middle distance.

The LVDS is a circuit for serially transmitting data in a low amplitude differential signaling method using electric potential difference between both ends of a resistance. The LVDS is a method for transmitting digital information through a copper cable to a flat panel display (TFT-LCD) at a high speed in a method suitable for high-frequency transmission. In other words, the LVDS is a transmission method for transmitting digital information to the flat panel display through the copper cable at high speed. In the term 'LVDS', 'LV' means a low voltage. That is, it means that the LVDS uses 3.3 or 1.5V instead of a standard voltage of 5V. The LVDS has been widely used in a laptop computer because it uses less cables between a motherboard and a panel. It has been widely used between image scaler and panel of many stand-alone flat panel displays. The LVDS transmits serial data at the maximum speed of 1 Gbps. The low voltage signal swing and current mode driver voltage output cause very low noise and require low power consumption that is almost constant at any frequency. In addition, differential data transmission used in the LVDS is less affected by common mode noise. The technology has been developed to provide high-speed data transmission function to various communication infrastructure applications such as a base station, household appliances such as a switch, an add/erase multiplexer and a set-top box, a home/commercial video link, a medical ultrasonic imaging and a digital copier. In addition, the technology provides flexibility of system division.

The LVDS provides a flexible architecture in which a system designer can arrange analog/digital signal processing block on an additional board and transmit digitized data from an analog/digital (A/D) converter through a cable or a rear surface.

Digital Visual Interface (DVI) or High Definition Multimedia Interface (HDMI) uses a digital transmission protocol such as a TMDS (Transition minimized differential signaling) link. Accordingly, signal conversion chipsets such as a TMDS transmitter or a TMDS receiver of a TMDS link type are required to support the DVI. The link has been developed by Silicon Image Inc. of U.S. and become a worldwide standard. It can transmit digital data from a graphic card to a monitor by including a transmitter at the graphic card and a receiver at the monitor. An object of the TMDS link is to convert digital data output from a PC into a signal that can be transmitted to the more far distance in higher band through the longer cable without signal loss. That is the reason that the digital signal outputted directly from the PC is weak and thus cannot be transmitted to a long distance. When a PC is close to a monitor just like a notebook, digital signal have been transmitted between the PC and monitor by using the LVDS method. However, according to the method, the transmission distance is 5 m at maximum. Accordingly, the method is impossible to transmit the digital signal to the relatively long distance, for example the distance between a desktop PC and a monitor. Thus, the new method, that is, the TMDS link method has been developed. The TMDS can be operated at 165 MHz. A single 10-bit TMDS link has a bandwidth of 1.65 Gbps and thus the link can operate in the speed when a digital image signal of 1920×1080 resolution is transmitted at 60 Hz.

The difference between the methods is based on the distance between transmitting and receiving ends. Each transmission method uses a serial method in common. Development of the methods have increased the transmission speed of multimedia data between a hard drive and a mother board, a laptop PC body and an LCD monitor, and from a desktop PC body and an LCD monitor.

However, in the platforms using the transmission methods, the transmission speed are increased more or less but there is almost no difference from the conventional method in noise caused by environments such as electromagnetic wave (EMI) and disturbance, resolution and a simple transmission line. In addition, there have been many problems that the conventional transmission method could not have solved in cases where only monitors are connected to a server without several PCs, and data in the PC body is transmitted to the monitor from very far distance or the PC body or monitor is remotely controlled.

There has been proposed a method using an optical cable to solve the problems occurring in the long distance transmission. When the optical cable is used, it is possible to solve problems such as the long distance data transmission and electromagnetic wave (EMI).

FIGS. 1*a* and 1*b* show examples of a transmitting end and a receiving end of an optical transmission IC using a conventional optical cable.

FIG. 1*a* shows the transmitting end of the conventional optical transmission IC. A reference number 11 indicates a video card of a personal computer body, a reference number 12 indicates a camera and a reference number 13 indicates a set-top box. In addition, a reference number 14 indicates a transmission chip, which includes a parallel/serial conversion logic 14*a* converting parallel data into serial data and a drive logic 14*b* performing optical transmission of the converted serial data.

A reference number 15 indicates an optical transmission drive unit including a plurality of VCSEL drive ICs generating inputted TMDS/LVDS format serial data into an analog optical signal, and a reference number 16 indicates an optical signal generator generating an optical signal by interlocking with the optical transmission drive unit 15, transmitting the signal to an optical cable (a plastic optical cable of 250 μm or a glass optical cable of 62.5 μm). In addition, the optical signal generator 16 includes a plurality of optical signal generating elements.

A reference number 17 indicates a logic IC transmitting DDC data generated from the set-top box 13, interfacing the DDC data transmitted from a receiving end to the set-top box 13. A reference number 18 indicates a DDC data drive unit generating the DDC data into an analog optical signal or converting a received analog signal into an electrical signal. The DDC data driving unit 18 includes a VCSEL drive IC 18*a* generating DDC data into an analog optical signal, transmitting the signal and a photodiode receiver IC 18*b* converting a converted electrical signal into DDC data.

A reference number 19 indicates an optical signal generator and receiver transmitting an optical signal to an optical cable by operating with the DDC data drive unit 18 or receiving an optical signal transmitted from the optical cable. The optical signal generator and receiver includes an optical signal generator 19*a* generating an optical signal by operating with the VCSEL drive IC 18*a* and an optical signal receiver 19*b* receiving an optical signal transmitted from the optical cable.

FIG. 1*b* shows a receiving end of a conventional optical transmission IC. A reference number 21 indicates an optical signal receiver receiving an optical signal transmitted through an optical cable (a plastic optical cable of 250 μm or a glass optical cable of 62.5 μm) and the optical signal receiver 21 includes a plurality of optical signal receiving elements.

A reference number 22 indicates a photodiode receiver converting a signal received from the optical signal receiver 21 into TMDS/LVDS format non-serial data, which includes a plurality of photodiode receiver ICs.

A reference 23 indicates an optical signal receiver and generator receiving an optical signal transmitted from the optical signal receiver 21 or converting DDC data into an optical signal, transmitting the signal to the optical cable. The optical signal receiver and generator includes an optical signal receiver 23*a* receiving the optical signal transmitted from the optical cable and an optical signal generator 23*b* generating an optical signal and transmitting the signal to an optical cable.

A reference number 25 indicates a logic IC receiving the DDC data generated from the set-top box 13 and transmitting the DDC data to the set-top box 13. A reference number 26 indicates a receiving IC, which includes a receiving logic 26*a* receiving TDMS/LVDS format data converted into an electrical signal and a deserial logic 26*b* converting the TMDS/LVDS format data received from the receiving logic 26*a* into TTL data of 12/24/48 bit, transmitting the converted TTL data to a TFT-LCD panel 27 or a PDP panel 28.

ICs for using the conventional cable are used to transmit only video and audio signals of PC, HDTV, etc. Accordingly, the ICs cannot be used in various fields and can be used in limited fields such as a PC body and an LCD monitor (PDP monitor) as shown in FIGS. 1*a* and 1*b*.

Accordingly, usability of expensive IC and cable is restricted to the limited fields.

In addition, the conventional optical transmission IC for a specific use is designed not to interrelate with LVDS or TMDS mode, and so limitedly used to characteristics of media, transmission distance and so on.

DISCLOSURE OF INVENTION

Technical Problem

Accordingly, the present invention is to solve problems generated from decrease of efficiency of the conventional high-priced optical transmission IC and optical cable.

An object of the present invention is to provide a multimedia data receiver using an optical cable that can receive multimedia data such as an image, voice and control signal whose media are different from each other through an optical transmission medium such as plastic or glass optical cables in a short or long distance area.

An another object of the present invention is to provide a multimedia data receiver using an optical cable that can receive various multimedia and perform communication of various interface signals with one chip, simultaneously using an optical cable instead of a coaxial cable in contents restricted and limited to conventional multimedia transmission media and transmission chips.

Technical Solution

According to an aspect of the present invention, there is provided a multimedia data receiver, which includes: an optical driver, amplifying a received signal of a single transmission format that is optical-to-electrical converted by an optical module connected to an optical cable, converting a serial data for transmission into an analog signal, performing optical transmission through the optical module; an interface control logic, extracting a control signal from the signal received through the optical driver, interfacing control data; and a digital signal processing logic, converting the signal received through the optical driver into data of the original transmission format through converting the signal into a digital signal and decoding the digital signal, deserializing a serial image data, transmitting the data to a display device connected thereto.

The multimedia data receiver according to the present invention can receive multimedia such as an image, voice and control signal whose media are different from each other using optical transmission media such as plastic or glass optical cables to a short or long distance area. The multimedia data receiver can secure a transmission channel free from electromagnetic wave (EMI) and disturbance that are characteristics of optical transmission media by serially receiving all multimedia data using an optical medium. It is possible to simplify a receiving cable and receive various media. In addition, it is possible to receive multimedia information and control various interfaces.

Advantageous Effects

According to the present invention, the multimedia data receiver can produce the following effects.

First, the optical IC for receiving integrated multimedia data can solve the problems that may occur when the data is received through the conventional coaxial cable.

Second, the multimedia data receiver can receive the multimedia data of various transmission format and provide various interfaces. Therefore, an efficient system can be constructed through one platform connected to many users and monitors. In addition, it can provide very high data receiving efficiency because it can be used regardless of transmission distance.

Third, the system can be easily integrated and operated in comparison to the conventional transmission methods. Thus, the multimedia data receiver can improve efficiency of material and human resources and create great demand in the field of using the platform.

BRIEF DESCRIPTION OF DRAWINGS

The above and other objects, features and advantages of the present invention will be more apparent from the following detailed description taken in conjunction with the accompanying drawings, in which.

MODE FOR THE INVENTION

Figure 1:
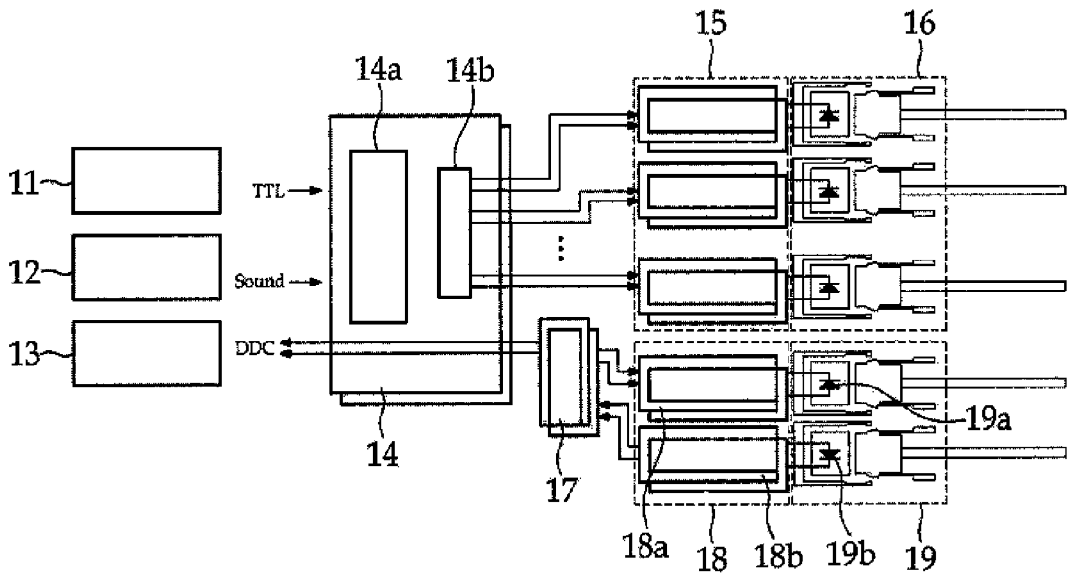
FIGS. 1*a* and 1*b* are views illustrating constructions of transmitting and receiving ends of a conventional optical transmission IC.
Figure 1:
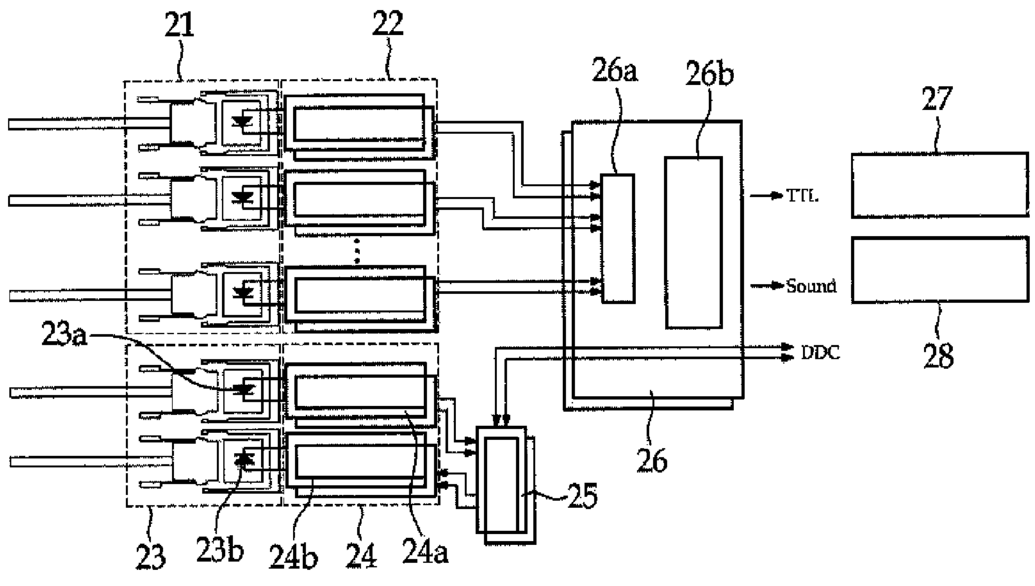

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
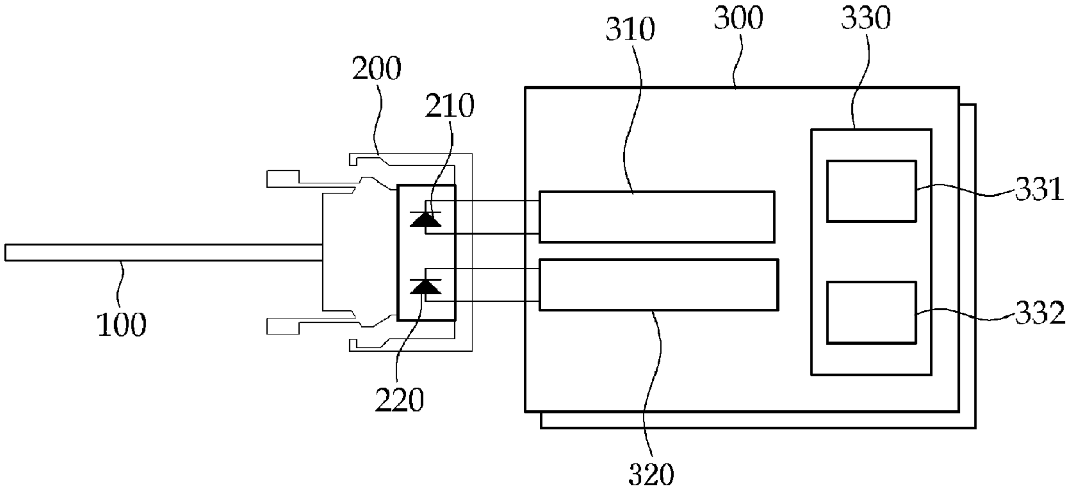
FIG. 2 is a view illustrating construction of a multimedia data receiver according to a first exemplary embodiment of the present invention.
Figure 3:
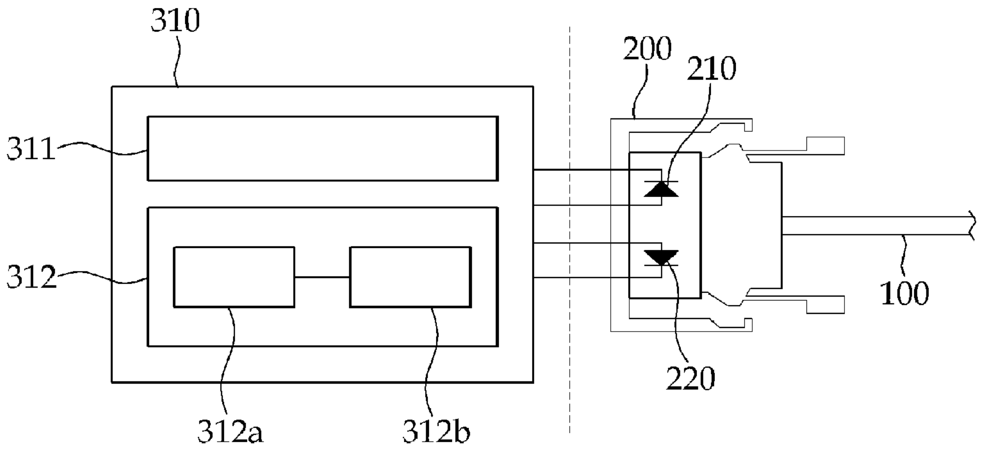
FIG. 3 is a view illustrating construction of an optical driver and an optical module according to a first exemplary embodiment of the present invention.
Figure 4:
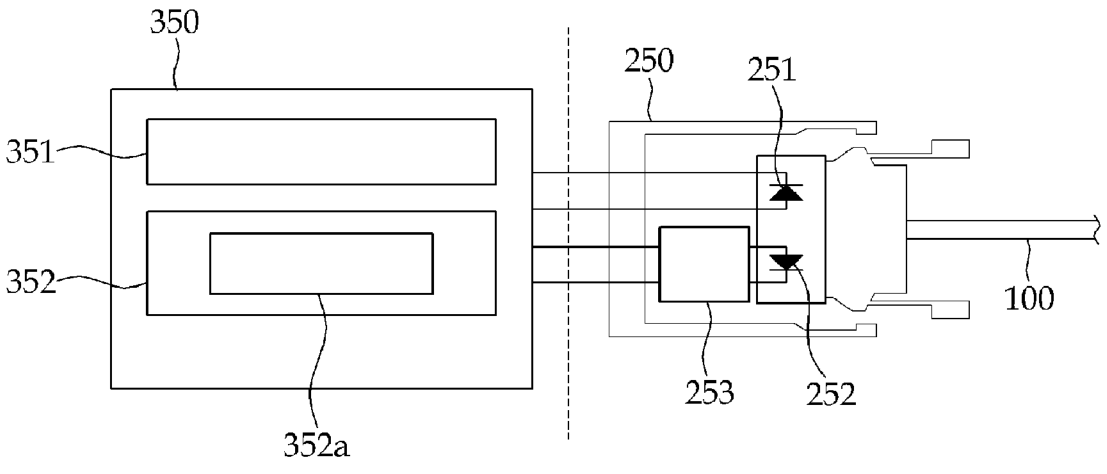
FIG. 4 is a view illustrating construction of an optical driver and an optical module according to a second exemplary embodiment of the present invention.

FIG. 2 is a view illustrating construction of a multimedia data receiver according to a desirable exemplary embodiment of the present invention. FIGS. 3 and 4 are construction views illustrating exemplary embodiments of the optical driver shown in FIG. 2.

A multimedia data receiver 300 includes an optical signal transmitting/receiving unit, an analog signal processing unit and a digital signal processing unit.

The optical signal transmitting/receiving unit may include an optical module 200 converting an optical signal received through an optical cable 100 into an electrical signal, converting a transmitting signal into an optical signal, and transmitting the signal to the optical cable 100. The optical module 100 may include an optical receiver 210 converting into an electrical signal by optical-to-electrical converting an optical signal received through the optical cable 100 and an optical generator 220 transmitting an optical signal to the optical cable 100 by electrical-to-optical converting a transmitting signal.

It can be generated that an optical module becomes distant from an optical driver according to states and environments of application domains. In order to apply to these environments, as shown in FIG. 4, an optical module 250 may include an optical receiver 251 optical-to-electrical converting a signal received through the optical cable 100, converting the converted signal into an electrical signal, a preamplifier 253 pre-amplifying the electrical signal converted by the optical receiver 252 and then transmitting the signal to optical driver and an optical generator 252 electrical-to-optical converting a transmitting signal generated from the optical generator and then transmitting an optical signal to the optical cable 100.

The analog signal processing unit may include an optical driver 310 performing optical transmission of serial data generated from a digital signal processing logic 330 according to a control signal generated from an interface control logic 320, processing a receiving signal optical-to-electrical converted.

The optical driver 310, as shown in FIG. 3, may include an optical drive logic 311 driving the optical module 200 after converting digital serial data into an analog signal and then performing optical transmission and an optical signal receiving logic 312 processing a receiving signal optical-to-electrical converted by the optical module 200. The optical signal receiving logic 312 may include a preamplifier 312*a* pre-amplifying a receiving signal optical-to-electrical converted by the optical module 200 and a current-limit amplifier 312*b* limiting a current level of the receiving signal amplified by the preamplifier 312*a*.

Meanwhile, in order to apply to an environment that an optical module 200 becomes distant from an optical driver 310, the optical driver 310 can be substituted for an optical driver 350 as shown in FIG. 4. In this case, the optical driver 350 may include an optical drive logic 351 driving an optical module 250 and then performing optical transmission after converting digital serial data into an analog signal and an optical signal receiving logic 352 processing a receiving signal optical-to-electrical converted by the optical module 250. In this time, the optical signal receiving logic 352 may include a current-limit amplifier 352*a* limiting a current level of the receiving signal pre-amplified by the preamplifier.

The digital signal processing unit is divided into the above-described interface control logic 320 and the digital signal processing logic 330. The digital signal processing logic 330 may include a data format converter 331 decoding a receiving signal converted and received in a format of single transmission mode according to a control signal of the interface control logic, converting multimedia data into a format of original transmission mode (12/24/48 bit TTL,TMDS/LVDS DATA), and a deserializer 332 deserializing serial data converted from the data format converter 331 and then transmitting the data to connected display devices (Flat Panel monitor, HD Graber Card, all display Interface) or sound devices and I/O (USB, IEEE 1394, LAN, keyboard, mouse and reserved channel).

In the optical module 200, the optical generator 210 transmits an optical signal to the optical cable 100 by electrical-to-optical converting a receiving signal and the optical receiver 220 transmits an electrical signal to the optical signal receiving logic 312 inside the optical driver 310 by electrical-to-optical converting a signal received by the optical cable 100

It is optimal in an environment when the optical module 200 is close to the optical driver 310. In some cases, it can be generated that the optical module 200 becomes distant from the optical driver 310, thus, signal error can be generated by signal loss or influence of electromagnetic wave or signal interference. In order to reduce errors of a receiving signal, the optical module 250 as shown in FIG. 4 may be realized in the present invention.

For example, losses or errors of a receiving signal can be reduced by adding the preamplifier 253 to the optical module 250, pre-amplifying a signal received by the optical receiver 252 and then transmitting the signal to the optical driver 310, when the optical module 200 becomes distant from the optical driver 310

Next, the optical driver 310 processes an analog signal received by the optical module 200 and converts a transmitting signal into an analog optical signal, and then transmits the signal to the optical module 200

As shown in FIG. 3, the optical drive logic 311 of the optical driver 310 performs optical transmission by converting transmission data into an analog signal and then driving the optical generator 210 of the optical module 200. The optical drive logic 311 uses optical transmission vertical-cavity surface-emitting laser (VCSEL). VCSEL has many advantages in structural characteristics, in comparison with a horizontal emitting laser. Particularly, VCSEL is a low power element for being easily connected to a pure single wavelength and single mode optical fiber. The VCSEL can perform optical transmission because of generating an optical analog signal. Generally, if data are transmitted using a conventional optical cable, VCSEL is used, in this time, most of optical drivers exist outside of a chip. The main reason why the drivers exist outside of the chip is that it is difficult to embody a mixed-mode where a digital domain and an analog domain coexist in the process. Further, there is no greater restriction to the optical communication even though the optical driver exists outside without need to exist inside. However, the present invention performs optical communication simply with one chip by locating the optical driver is located inside the multimedia data receiver 300.

In addition, the optical driver 310 is equipped with the optical signal receiving logic 312 processing a received signal optical-to-electrical converted by the optical module 200. The preamplifier 312*a* of the optical signal receiving logic 312 pre-amplifies the signal optical-to-electrical converted by the optical module 200, and the current-limit amplifier 312*b* limits a current level of a signal amplified by the preamplifier 312*a* and transmits the signal to the digital signal processing logic 330 or the interface control logic 320 in a digital form.

Meanwhile, the optical driver 310 can be embodied as the same configuration as FIG. 4 in order to apply to the environment of becoming distant from the optical module 200. In other words, the optical drive logic 351 of the optical module as shown in FIG. 4 electro-to-optical converts a transmitting signal and then transmits the signal to the optical module 250. The optical signal receiving logic 352 limits a current level of a signal amplified by the preamplifier 253 and then transmits the signal to the digital signal processing logic 330 or the interface control logic 320

The interface control logic 320 extracts only control data from the transmitted signal and then transmits the data to the digital signal processing logic 330 to decode transmission format data into format data in an original transmission mode.

As not shown in drawings, the interface control logic 320 generates a sync signal (vertical and horizontal sync signal) and provides the signal to the digital signal processing logic 330 like the transmission of the image signal, thus performs simplex transmission.

As data format and sync signals are controlled in the simplex, and an image is transmitted to the digital signal processing logic 330 performing sync signal and format without forming a special control block. The simplex transmission is performed by synchronizing image data with voice data, or only voice data is transmitted without additional sync signal.

However, when image and voice are optically transmitted, an application range is so narrow. In order to improve utility efficiency of the optical cable, the present invention is to provide various interfaces from the interface control logic 112 to directly use interfaces belonging to a category of a PC such as USB, IEEE 1394, local area network (LAN), a keyboard, a mouse, IRDA, DDC, Bluetooth, a reserved channel, etc.

The functions, as shown in FIG. 6, have advantages of providing very simple environments for PC users and removing difficulties in using due to disconnection. In other words, it can simplify computing environments greatly as users have only to use devices capable of performing direct input/output with the users such as a monitor, a keyboard, a mouse, a scanner, a laser printer, a personal digital assistant (PDA), etc to be really used. In this time, the keyboard, the mouse, etc are input or output devices, and the printer and PDA, etc are bidirectional devices. Further, data transmission schemes such as the USB, the LAN, IEEE 1394, etc are bidirectional transmission.

Likewise, devices that are connected to the monitor and used have unidirectional and bidirectional characteristics and it cannot be realized by using a conventional application-specific chip for optical transmission. The present invention is to perform data transmission for satisfying unidirectional and bidirectional characteristics using a digital signal processing logic and an interface control logic.

The data format converter 331 of the digital signal processing logic 330 processing a digital signal converts a format of inputbutput data. For example, the data format converter 331 converts data formats of data transmission modes such as S-ATAx, LVDS and TMDS into a single transmission format in case of transmission, and performs the operation reversely in case of reception. Each data is controlled by a control signal to be suitable for characteristics of applications (PC, Set-top Box, Camera, Video, etc). In other words, it needs data conversion into LVDS when a body is adjacent to a monitor, into S-ATA and LVDS when a general notebook monitor is connected to a general monitor not for a notebook and into LVDS and TMDS when a desktop is connected to a notebook monitor or a desktop is connected to a monitor that is far from the desktop. It must be possible to perform interface between transmission modes to apply to various cases.

Accordingly, in the present invention, the data format converter 331 decodes a signal received according to control data extracted from the interface control logic 320 into original transmission format data in order to perform data transmission between transmission modes at high speed.

In addition, the deserializer 332 performs deserialization to transmit reception data converted into serial data to connected display devices or sound devices. Any devices for converting general serial data into non-serial data can be used for the deserializer 332.

The receiver according to the present invention can transmit multimedia data in various transmission formats. The transmission method of the multimedia data is performed in the reverse order of the above described receiving method of the multimedia data. Therefore, it should be understood by those of ordinary skill in the art that the above-described reception method may be made therein. Accordingly, the detail explanation will be omitted.

INDUSTRIAL APPLICABILITY

As described above, it can be used for devices transmitting data from a monitor to connected devices at a close range or at a long distance according to the present invention. Particularly, it can be used for all devices receiving various multimedia data through an optical cable and then displaying the data to a monitor.

The invention claimed is:

1. A multimedia data receiver, comprising:

an optical driver, amplifying a received signal of a single transmission format that is optical-to-electrical converted by an optical module connected to an optical cable, converting a serial data for transmission into an analog signal, performing optical transmission through the optical module;

an interface control logic, extracting a control signal from the signal received through the optical driver, interfacing control data; and a digital signal processing logic, converting the signal received through the optical driver into data of the original transmission format through converting the signal into a digital signal and decoding the digital signal, deserializing a serial image data, transmitting the data to a display device connected thereto.

2. The multimedia data receiver of claim 1, wherein the optical module comprises:

an optical receiver, optical-to-electrical converting the optical signal received by the optical cable into an electrical signal; and an optical generator, electrical-to-optical converting a transmission signal, transmitting the converted optical signal to the optical cable.

3. The multimedia data receiver of claim 1, wherein the optical module comprises:

an optical receiver for optical-to-electrical converting the signal received by the optical cable into an electrical signal;

a preamplifier, pre-amplifying the electrical signal converted by the optical receiver, transmitting the pre-amplified signal to the optical driver;

an optical generator, electrical-to-optical converting the signal transmitted by the optical driver, transmitting the optical signal to the optical cable.

4. The multimedia data receiver of claim 2, wherein the optical driver comprises:

an optical signal receiving logic processing the received signal that is optical-to-electrical converted by the optical module; and an optical drive logic, driving the optical module according to the transmitted from the optical driver to perform optical transmission.

5. The multimedia data receiver of claim 4, wherein the optical signal receiving logic comprises:

a preamplifier pre-amplifying the received signal that is optical-to-electrical converted by the optical module; and a current-limit amplifier limiting a current level of the signal pre-amplified by the preamplifier.

6. The multimedia data receiver of claim 4, wherein the optical signal receiving logic comprises a current-limit amplifier limiting the current level of the signal amplified by the preamplifier when the preamplifier is provided in the optical module.

7. The multimedia data receiver of claim 1, wherein the digital signal processing logic comprises:

a data format converter, decoding various multimedia data that are converted into a single transmission format according to a control signal extracted by the interface control logic, thereby converting the data into data of the original transmission format; and a deserializer, deserializing the serial data converted by the data format converter, transmitting the deserialized data to a display device connected thereto.

8. The multimedia data receiver of claim 1, wherein the interface control logic performs unidirectional or bidirectional data communication with devices such as USB, IEEE 1394, LAN, PDA, keyboard and mouse.

* * * * *